Nov. 21, 1950     H. J. PALUMBO     2,530,906

SHEET PACKING AND METHOD OF MANUFACTURE

Filed June 28, 1947

INVENTOR.
Henry J. Palumbo.
BY Virgil C. Kline
ATTORNEY.

Patented Nov. 21, 1950

2,530,906

UNITED STATES PATENT OFFICE 2,530,906

SHEET PACKING AND METHOD OF MANUFACTURE

Henry J. Palumbo, Somerville, N. J., assignor to Johns-Manville Corporation, New York, N. Y., a corporation of New York Application June 28, 1947, Serial No. 757,831

9 Claims. (Cl. 260—37)

This invention relates to sheet packing, and is particularly concerned with resilient and flexible sheet packing which resists hardening and embrittlement under extremely high and low temperatures, and a method of making such packing.

Experience has shown that conventional sheet packing embodying asbestos or other reinforcing fibers and binders such as natural and synthetic rubbers, tends to become hard and brittle under prolonged exposure to extremely high or low temperatures. It has been further determined that the tendency of such sheets toward hardening and embrittlement under prolonged exposure to high or low temperatures is not materially improved by the addition thereto of compatible plasticizers in the amounts permitted by the method of manufacture and by the desired final properties of the sheet.

A primary object of the present invention is to provide a fiber reinforced sheet which retains resilience and flexibility under prolonged exposure to high or low temperatures.

A particular object is to provide a compressed asbestos sheet packing which retains adequate strength and flexibility under prolonged exposure to temperatures over the range —60° F.-600° F.

With the above objects in view the invention consists in the improved sheet packing and method of manufacturing same which is hereinafter described and more particularly defined by the accompanying claims.

Figure 1:
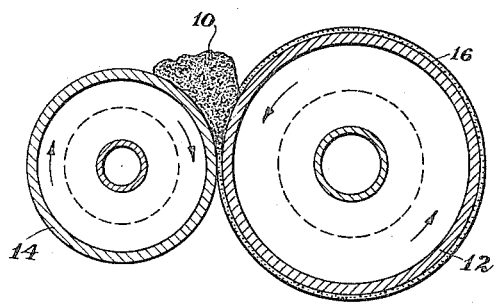
Figure 2:
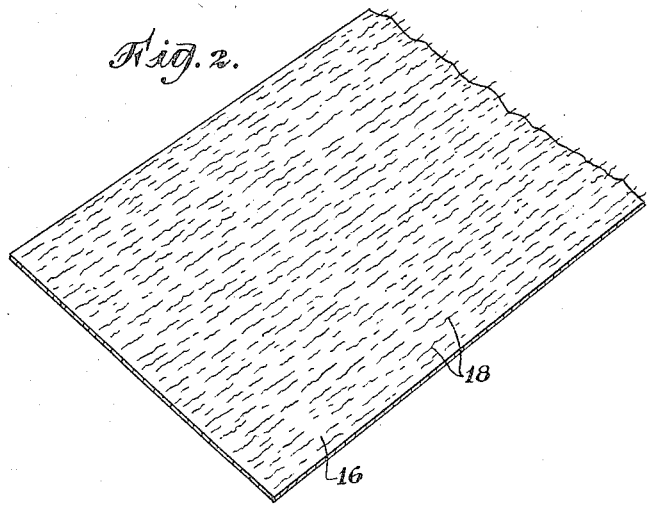

In the following description, reference will be made to the attached drawing, in which:

Fig. 1 is a cross sectional view of a hot and cold roll mill such as employed for initially forming the compressed sheet packing; and Fig. 2 is a perspective view of a compressed asbestos sheet packing.

The basis of the sheet packing which forms the subject of the present invention is the discovery of a packing composition and method of manufacture which develops good tensile and shear strength, and which retains resilience and flexibility under prolonged exposure to extremely low temperatures and to temperatures throughout the range 300-600° F.

The binder component of the sheet packing of the present invention is a synthetic rubber-like compound which is heat curable to an infusible insoluble form, but which remains flexible under exposure to temperatures of —60° F.-600° F. Prior to heat conversion the binder is a viscous liquid chain polymer containing dialkyl silicol and dialykyl silicone groups which on heat curing treatment undergo further polymerization and condensation reactions, with loss of molecular water. In these compounds the alkyl radicles include the lower alkyl groups including methyl, ethyl, propyl and butyl.

Compressed sheet packing which contains heat converted infusible insoluble polymerized dialkyl silicones as the binder exhibits great stability under exposure to extreme high or low temperatures, and also possesses good dielectric properties. However, difficulty has been encountered in attempts to apply these silicol and silicone polymers to the manufacture of sheet packing, by reason of the undesirably low tensile and shear strength of the resulting compressed sheet products. It has now been discovered that compressed sheet packing of adequate tensile and transverse shear strength, as well as resilience and flexibility under prolonged low or high temperature exposure, results from employing well opened crocidolite asbestos fiber as the principal reinforcing fiber in sheets incorporating a heat convertible partially polymerized dialkyl silicone as the principal binder. The packing may incorporate a high proportion of finely divided inert pigment or filler particles in addition to the silicone resin binder and fibers. The packing normally should contain upwards of 25% by weight of the silicone binder, and the strongest sheets contain a high proportion of reinforcing fibers, including upwards of 15% crocidolite fiber.

A suitable binder for sheet packing in accordance with the present method is a polymerized dialkyl silicone, such as dimethyl or methyl ethyl silicone. At the stage of partial polymerization at which the binder is mixed with the fibers it is a viscous and sticky liquid which is soluble in gasoline, toluene, or other solvent, and is essentially a rubbery chain polymer. At this stage the binder is heat convertible by further polymerization and condensation, during which combined water is lost and cross linkage apparently occurs in developing a heat cured product which is infusible and insoluble but still flexible.

In fabricating compressed sheet packing a heat convertible dimethyl silicol in viscous liquid form is placed in churn to which a solvent such as gasoline is also added. The churn is operated to reduce the binder to a suitable liquid slurry. Crocidolite asbestos fibers which have been well opened are then added to the slurry, and the mass is worked within the churn until the fibers are completely coated with the silicone binder and a plastic dough is formed. In addition to the crocidolite asbestos fibers other fibers such as chrysotile or mineral wool, and finely divided filler materials such as calcium carbonate and titanium dioxide, may be incorporated in the plastic dough. The proportions of fibers and filler particles to silicone binder may be as high as two or three to one, by weight.

A mass 10 of the plastic dough which results from the churn mixing operation is placed between two rolls running at even speed. One roll 12 is heated with steam to a temperature ranging from 150–200° F. The other roll 14 is preferably cooled by circulation of cold water therethrough. As excess solvent is volatilized from the surface of the dough adjacent to the surface of the hot roll, the binder coated fibers adhere to the surface of the hot roll, forming a continuous sheet 16. The two rolls are rotated at fairly high speed and they are gradually seperated as the operation continues to increase the spacing between the rolls and permit building up of the sheet 16 on the hot roll to suitable thickness. During this forming operation most of the fibers 18 are drawn into alignment in the direction of roll movement. The sheet is then cut from the roll and dried in an oven at a temperature of 100–125° F. for several hours to remove any residual solvent which may be present. The oven dried sheet is cold pressed at 500 lbs./square inch for about three minutes, and the cold pressed sheet may then be cured in an oven at a temperature of 480° F. over a period of twenty minutes to three hours.

The compressed sheet packing which results from the above treatment has been found to stand up under prolonged heating to temperatures within the range 300–600° F. without any hardening or embrittlement. Furthermore, the product will retain resilience and flexibility at much lower temperatures than any other comparable type of sheet packing. It has been found that heat cured dialkyl silicone sheet packings which are reinforced with crocidolite asbestos fiber in amounts ranging from 15% to 50% by weight, have the properties of adequate cold flow, a servicable compression set, and high resistance to extremely high and low temperatures. Such sheets also have good dielectric properties and good arcing and induced power factor.

As evidencing the advantage of using crocidolite asbestos fibers in making up such sheet packing, two comparable sheets were made up each containing 100 parts by weight of heat convertible dimethyl silicone binder, 175 parts of finely divided filler particles consisting of calcium carbonate and titanium oxide, and 50 parts by weight of asbestos fibers comprising chrysotile asbestos fibers in one sheet and crocidolite asbestos fibers in the other sheet. Tensile strength determinations were made both on the cured sheets and on the uncured sheets. The uncured sheets containing chrysotile asbestos fibers had substantially no transverse tear strength and a tensile strength in the direction of the fibers of the sheet of 290 lbs./square inch. After cure, this same sheet still exhibited very low transverse tear strength and had a tensile strength in the longitudinal direction of the fibers of 412 lbs./square inch. The comparison sheet sample containing crocidolite fibers, prior to cure, had a tensile strength with the grain of 943 lbs./square inch, and a transverse tear strength of 126 lbs./square inch. The cured sheet containing crocidolite fibers had a tensile strength with the grain of 2,498 lbs./square inch, and a transverse tear strength of 749 lbs./square inch.

It is believed that the aforementioned results may be explained, in part at least, by the fact that crocidolite fibers have a much lower degree of alkalinity in comparison with chrysotile asbestos, and that the alkalinity of the chrysotile asbestos has a retarding effect on the heat curing of silicone resins. Conventional chrysotile fibers have a pH of 8.8, whereas crocidolite fibers have a pH of 7.6.

The invention which has been thus described by detailed example is not limited as to such details and it is to be understood that variations, changes and modifications are contemplated within the scope of the invention as defined by the following claims.

What I claim is:

1. A flexible sheet which resists embrittlement and hardening at extreme high and low temperatures comprising a mixture of infusible insoluble polymerized dialkyl silicone binder and reinforcing fibers including 15–50% of crocidolite asbestos fibers, the alkyl radicals in said binder belonging to the group consisting of methyl, ethyl, propyl, and butyl.

2. A flexible sheet which retains flexibility and resilience at temperatures in the range −60° F.–600° F. comprising a pressure molded and heat cured mixture of polymerized dialkyl silicone binder and a major proportion by weight of filler particles and reinforcing fibers including 15–50% of crocidolite asbestos fibers, the alkyl radicals in said binder belonging to the group consisting of methyl, ethyl, propyl and butyl.

3. A sheet packing which retains flexibility and resilience at temperatures in the range −60° F.–600° F. comprising a pressure molded and heat cured mixture of dimethyl silicone binder and a major proportion by weight of filler particles and reinforcing fibers including crocidolite asbestos fibers, said sheet containing at least 25% by weight of said binder and at least 15% by weight of crocidolite fibers.

4. A compressed sheet packing which retains flexibility and resilience at temperatures in the range 300° F.–600° F. comprising a major proportion by weight of reinforcing fibers including 15%–50% crocidolite asbestos fibers, and at least 25% by weight of dimethyl silicone polymer binder, said sheet having most of its fiber content disposed in parallel lay and having a tensile strength in the direction of fiber lay higher than 2000 lbs./square inch.

5. A sheet packing which retains flexibility and resilience at temperatures in the range −60° F.–600° F. comprising, a major proportion by weight of filler particles and reinforcing fibers including at least 15% by weight of crocidolite asbestos fibers uniformly distributed in substantially parallel lay, the fibers being coated and bonded by dimethyl silicone binder present in amount representing 25–35% by weight of the sheet, and said sheet having a tensile strength higher than 2000 lbs./square inch in the direction of fiber lay and a transverse tear strength greater than 600 lbs./square inch.

6. In making sheet packing adapted for use at extremely high and low temperatures the method which comprises, forming an intimate mixture containing solvent reduced liquid heat convertible dialkyl silicol polymer binder and a major proportion by weight of inert filler particles and reinforcing fibers including 15–50% of crocidolite asbestos fibers, the alkyl groups in said binder having 1–4 carbon atoms, sheeting out the mixture under pressure, and heating the resulting compressed sheets to impart a polymerization cure to the binder.

7. In manufacturing flexible sheets adapted for use at extremely high and low temperatures the steps comprising, forming an intimate mixture containing solvent reduced dialkyl silicone polymer and a major proportion by weight of filler particles and reinforcing fibers including 15–50% of crocidolite asbestos fibers, the alkyl radicals in said polymer belonging to the group consisting of methyl, ethyl, propyl, and butyl, sheeting out the mixture under pressure between rotating hot and cold rolls, and heat curing the sheet thus formed to convert the polymer to an infusible insoluble state.

8. In manufacturing sheet packing the steps comprising, forming an intimate mixture containing at least 25% by weight of heat convertible dialkyl silicone resin in solvent reduced state and a major proportion by weight of inert filler particles and reinforcing fibers including at least 15% by weight of well opened crocidolite asbestos fibers, the alkyl groups in said resin having 1–4 carbon atoms, sheeting out the mixture under pressure between hot and cold rolls whereby a sheet of suitable thickness is built up on the hot roll, drying the sheet to evaporate the solvent, compressing the thus dried sheet, and heat curing the sheet to convert the binder to an insoluble infusible form.

9. In manufacturing sheet packing the steps comprising, forming an intimate mixture containing 25%–35% by weight of dialkyl silicone polymer in viscous liquid state, a solvent for said polymer, together with inert filler particles and reinforcing fibers including 15%–50% crocidolite asbestos fibers, the alkyl groups in said polymer having 1–4 carbon atoms, churning the mixture to form a plastic dough, sheeting out the dough under pressure between hot and cold rolls, thereby building up the sheet to suitable thickness on the hot roll, and subjecting the resulting sheet to successive drying, pressing and heat curing treatments.

HENRY J. PALUMBO.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,407,520 | Smolak | Sept. 10, 1946 |
| 2,460,795 | Warrick | Feb. 1, 1949 |

FOREIGN PATENTS

| Number | Country | Date |
|---|---|---|
| 557,346 | Great Britain | Nov. 17, 1943 |

OTHER REFERENCES

Ladoo, "Non-Metallic Minerals," 1925, New York, page 62.